United States Patent [19]

Cox et al.

[11] Patent Number: 5,100,688

[45] Date of Patent: Mar. 31, 1992

[54] SACCHARIDE/PROTEIN GEL

[76] Inventors: James P. Cox; Florence F. Cox; R. W. Duffy Cox, all of 246 E. Bartlett Rd., Lynden, Wash. 98264

[21] Appl. No.: 484,379

[22] Filed: Feb. 23, 1990

[51] Int. Cl.⁵ .................. A23L 1/052; A23L 1/0524; A23L 1/0532; A23L 1/0534

[52] U.S. Cl. .................... 426/573; 426/574; 426/575; 426/577; 426/578; 426/657; 426/802

[58] Field of Search ............ 426/573, 574, 575, 577, 426/656, 657, 802, 578

[56] References Cited

U.S. PATENT DOCUMENTS

| | | | |
|---|---|---|---|
| 3,658,550 | 4/1972 | Hawley | 426/574 |
| 3,891,776 | 6/1975 | Carpenter et al. | 426/574 X |
| 4,324,807 | 4/1982 | Kim et al. | 426/574 X |
| 4,455,318 | 6/1984 | Maurice et al. | 426/574 X |
| 4,554,166 | 11/1985 | Morimoto | 426/574 X |
| 4,563,366 | 1/1986 | Baird et al. | 426/574 X |
| 4,741,906 | 5/1988 | Paardekooper et al. | 426/574 X |
| 4,844,922 | 7/1989 | Uemura et al. | 426/574 X |
| 4,880,654 | 11/1989 | Okada | 426/574 |
| 4,965,080 | 10/1990 | Akasaka et al. | 426/574 X |

FOREIGN PATENT DOCUMENTS

| | | | |
|---|---|---|---|
| 61-1358 | 1/1986 | Japan | 426/575 |
| 62-143653 | 6/1987 | Japan | 426/573 |
| 876090 | 10/1981 | U.S.S.R. | 426/574 |
| 912127 | 3/1982 | U.S.S.R. | 426/574 |

Primary Examiner—Arthur L. Corbin
Attorney, Agent, or Firm—Hughes & Multer

[57] ABSTRACT

A meat-free gel, which can be employed in the formation of artificial adiposes, comprising a fibrinogen and albumin containing protein constituent, e.g. blood, and a saccharide binder, e.g. algin, the protein constituent and binder being cross-linked to provide matrix-forming copolymeric networks. The artificial adipose contributes to a reduced cholesterol/saturated fat content in meat products and can be used in other products including skins and membranes, dewatering agents, coagulants and stabilizers for lipids.

9 Claims, No Drawings

SACCHARIDE/PROTEIN GEL

TECHNICAL FIELD OF THE INVENTION

This invention relates primarily to edible, artificial adipose products which, when added to meat, results in a meat product: which has lower cholesterol and/or saturated lipid contents than its conventional counterpart; which is juicier after preparation; and which is substantially indistinguishable from a freshly prepared, natural, comminuted meat product with an equivalent lipid content.

The term "adipose" as used in this specification refers to the natural complex of lipid and lipid bearing structural materials associated with meats. These materials include flavored oils and are generically referred to as fat.

In a second, and also important, aspect, the present invention relates to certain new and novel saccharide/protein gels which are employed in the novel artificial adiposes disclosed herein and which can also be used to produce a variety of other new and valuable products.

BACKGROUND OF THE INVENTION

The adipose of edible meat consists of fat matrixed in membraned cells in such a way that it is not simply free fat but a natural composition exhibiting specific characteristics of its own. Chicken skin, the white portions of bacon, milk fat globules, and suet are good, representative examples.

In comminuted meat, such as hamburger and ground sausage, adipose is distributed throughout as a separate, distinct component of the meat. The association of adipose lipid and adipose tissue results in specific and distinct complexes which do not behave as lipids do by themselves. For example, hamburger and sausage adipose contains a great deal of the ultimate aroma and taste characteristics of prepared hamburger and sausage. And, it does not melt all at once like the lipid alone would do. When the meat is cooked, the lipid portion of its adipose tissue can be dissociated from the remaining, primarily proteinaceous parts only with difficulty and with the application of high concentrations of heat and pressure. Thus, fried bacon adipose and others, after cooking, still retain their essential shape and residual high concentrations of lipids. Cooked meat may be chopped into pieces and maintained at temperatures well above the melting point of the lipid contained in its adipose tissue as is common in cooking many food dishes; but the adipose will not melt; and it is still a distinct substance.

It is known to those in the food trade and consumers alike that hamburger and sausage lose their appeal from the viewpoints of mouth feel and flavor when their adipose content drops below certain limits. The range of fat in hamburger varies from a low of about 16 percent to a high of over 30 percent. As a rule, the leaner the hamburger, the more expensive it becomes. Therefore, a typical quality of hamburger served in a restaurant contains only 74 percent lean meat and 26 percent fat.

One large fast food company specializing in hamburgers also uses a ratio of 74 percent lean meat/26 percent fat. In its "fancier" hamburgers, the fat content is decreased to 24 percent, still one-fourth of the product.

According to consumer data gathered by the American Meat Institute, 1988 per capita ground beef sales were 28.7 pounds which equates to 7.054 billion pounds (population base of 245.8 million). This was approximately 39 percent of the total meat consumption (including processed meats).

Information provided by Texas A&M, released in 1988 and summarized in the following table, shows relative regional variations of lipids (fat) in hamburger (or ground beef).

TABLE 1

| Region | Regular* | Lean* | Extra Lean* |
|---|---|---|---|
| Northeast & East | 41% | 37% | 22% |
| Southeast | 35 | 52 | 13 |
| N. Central | 21 | 38 | 41 |
| S. Central | 42 | 35 | 23 |
| Mountain | 68 | 23 | 9 |
| West | 37 | 37 | 26 |
| Average | 41 | 37 | 22 |

*Regular = 75% Lean/25% Fat
Lean = 80% Lean/20% Fat
Extra Lean = 85% Lean/15% Fat Ground beef constitutes 51 percent of all beef sold.

The importance of eating only sound, nutritious food has been recognized to a degree that today's consumer accepts the necessity of judicious food selectivity. This results in many consumers rejecting or limiting consumption of some foods heretofore considered to be healthful and delicious with culinarily less desirable but more healthful foods. This awareness has resulted in a revolution of individual eating habits that is crossing traditional international and cultural barriers in a wave of change.

In Western culture where both qualitative and quantitative adequacy of food exists, the public concern centers on such aspects as disproportionate intake of fats; overly refined, calorically concentrated foods; and, in particular, specifically currently undesirable components of some foods, such as those components containing significant amounts of saturated fats and cholesterol. As a consequence, traditional foods such as whole cream, eggs, cheeses, marbled meats, lunch meats, frankfurters, sausages, and the like have suffered diminution in consumption roughly in proportion to the concentration of cholesterol believed to be contained in them by the consuming public.

Such reduction in consumption has in some instances been profound as is the case with eggs, for example. A per capita reduction by half or more in consumption of eggs over the past decade has been seen.

Reductions in consumption of roasts, steaks, and other cuts of beef have also been substantial.

Hamburger and sausage adipose contains significant amounts of cholesterol and is comprised of highly saturated fats. Both, according to current beliefs, are deleterious nutritional substances. The popular trend is avoidance or restriction of foods containing these materials.

It is clear from the foregoing and other examples that unsaturated fats and oils are preferred over more saturated ones and that cholesterol content constitutes the basis of a compelling consumer rejection of even traditionally highly prized foods with significant saturated fat contents.

A primary portion of a characteristic meat flavor is found in its native adipose tissue as was mentioned above. It is therefore no accident that the finest cuts of meats, containing as they do marbling and high adipose concentrations, have the most agreeable and desirable meat flavors as well as the highest saturated fat contents.

Cholesterol is also found primarily in the adipose portions of meat. It is possible, therefore, to reduce both the saturated fat and cholesterol in ground meat products such as hamburger and sausages by simply selecting the leanest cuts and closely trimming these cuts of any freely associated adipose tissue before grinding them. Unfortunately, the resulting hamburger or sausage is reduced in edibility. It tends to lose flavor, to be somewhat crumbly, and to be difficult to both chew and swallow. Also, the absence of adipose tissue in trimmed and ground, lean cuts leads to difficulties during preparation, such as tendencies for the meat to dry out as it cooks, to cook unevenly, and to stick to cooking surfaces.

The drying out of the meat as it cooks can make it unsuitable for commercial applications. In particular, in fast food establishments, it is important to prepare food in advance of high demand periods to prevent customers from waiting overly long for food. Such food preparation services have demonstrated great skill in developing strategies for dealing with this problem. Some have special fast cooking methods and even devices for preparing hamburgers rapidly which seal in juices so that the product does not become dry upon standing for short periods before consumption. And some go so far as to discard any prepared (cooked) hamburger meat if it is held for more than 8 to 12 minutes before purchase by a consumer to guarantee the quality of product which they sell.

Many methods for removing cholesterol from natural food products other than the above-discussed trimming of fat from lean cuts of meat are known.

Such methods usually require that the material which is to be treated to reduce its cholesterol level be either in liquid form so that enzymes can be brought into adequate contact, or in dry form so that solvents can be applied for cholesterol removal.

Because of the foregoing limitations, no practical method for eliminating cholesterol and/or saturated fats from hamburger and other products containing comminuted meats has yet been discovered. The expedient of simply using lean meat is too great an expense for many institutions and consumers. Also, the consequent losses in flavor, texture, and moistness may make the end product unacceptable.

Those other proposed methods of reducing cholesterol relative to total weight of meat by simply adding moisture cause a loss of product identity since the characteristics of meats with high moisture content—notorious in the case of hams, for example—are significantly different from those to which water has not been added Also, the shrinkage which results when an "added water" meat is cooked results in an eventual equal concentration of cholesterol on a weight-for-weight basis. Furthermore, the cost of the additional processing makes the "added water" meat more expensive than it would be if lean meat were simply purchased to start with.

SUMMARY OF THE INVENTION

There have now been invented and disclosed herein: (1) certain new and novel comminuted meat products which have reduced contents of cholesterol and saturated fats but do not have the drawbacks of heretofore available products of that character, and (2) methods which can be used to make such products and which avoid such problems as those associated with pumping water into meat, trimming away all visible fat, etc.

A major aspect of this invention is the discovery that the specific fraction of blood referred to as "plasma" (1) possesses cooked flavors exactly like those associated with the meat from which the plasma is derived, and (2) can be emulsified and/or functionally cross-linked with vegetable gums and decholesterolized, low cholesterol, and cholesterol free oils and fats and analogues which may also be free, or have a low degree, of saturation.

It has also been discovered that, by combining: (1) blood plasma binding agents, (2) gellable vegetable gums such as sodium alginate, and (3) unsaturated and/or substantially decholesterolized or cholesterol-free oils or fats or analogues thereof, the plasma can inexpensively be made into products indistinguishable from the natural adipose associated with or normally added to hamburger, sausage, and other ground meats. When artificial adipose produced according to this invention is combined with lean meat to produce hamburger or sausage, that hamburger or sausage will have all functional and organoleptic properties of hamburger or sausage made with natural adipose. It may also have a greatly reduced cholesterol content and, if desired, a similarly reduced saturated fats content. By adjusting the moisture-to-lipid concentration and gelation of the gel and/or its ratio of hydrophilic to hydrophobic ingredients, the artificial adipose can also be made to: (1) impart such other desirable properties such as greater juiciness, juiciness for longer periods after preparation, and reduction of shrink to comminuted meats; and (2) reduce the expense of procurement and preparation of such meats.

The blood protein/vegetable gum (saccharide) fraction of the artificial adiposes disclosed herein can be formulated as gels having unique properties which can be taken advantage of to produce a host of other novel and valuable products.

OBJECTS OF THE INVENTION

It is one important object of the present invention to provide for inclusion in comminuted meats and meat products in place of a substantial portion of the adipose normally found associated with such products an edible, artificial adipose which is lower in cholesterol, may be lower in saturated fats, and is inexpensive and simple to produce.

A related, also important object of the invention resides in the provision of products which contain artificial adipose tissue and which are, functionally and organoleptically, substantially equivalent to conventional comminuted meats.

Another object of the invention is to provide substitute adipose products which keep cooked, comminuted meats juicy for longer periods of time than cooked, natural and comminuted, meat products stay juicy.

An additional object of the invention is to provide a substitute adipose product which, when added to comminuted meat, results in a product containing fewer calories than a natural comminuted meat containing an equivalent amount of adipose without diminution of natural taste, flavor, texture, or functional quality.

A further, also primary and important object of the invention resides in the provision of novel blood protein/saccharide emulsions and gels which can be employed to produce the novel artificial adiposes disclosed herein and a host of other new and valuable products.

Still other important objects of the invention, as well as additional features and advantages, will be apparent to the reader from the foregoing, the appended claims, and the ensuing detailed description and discussion of the invention.

DETAILED DESCRIPTION OF THE INVENTION

As discussed above, the present invention takes advantage of an edible, artificial adipose tissue based on emulsified blood plasma to provide comminuted meat products of reduced cholesterol and/or saturated fat content, to otherwise impart nutritional superiority to those products, and to keep them "juicy" for longer periods of time after they are cooked than is possible in the case of otherwise formulated, cooked meats of comparable cholesterol and saturated fat content.

While any undenaturized food grade blood can be used, edible blood from the specie of animal producing the meat to which the artificial adipose is to be added is preferred. The blood is collected; treated to interrupt, postpone or prevent clotting; and then centrifuged until all or most of the red blood cells have been removed. These are discarded or used for other purposes.

The supernatant, referred to as "plasma," contains as primary components the sacroplasmic proteins fibrinogen and albumin. The sacroplasmic proteins are the important fractions of blood plasma, as far as the present invention is concerned, because they give meat its characteristic taste, aroma, and related characteristics. Some phospholipids are complexed with the protein fractions; and the plasma may contain low concentrations of sterols, including cholesterol.

Alternatively, the plasma may be reconstituted from dried plasma; or a combination of fresh plasma and dried plasma can be used. Plasmas from different animals can also be mixed when desired.

The plasma may be partially or completed decolorized, depending on the meat with which the artificial adipose is to be used. Plasma destined for meat and meat analogues such as chicken, fish, and surimi, for example, must be decolorized so that the plasma will match the color of the meat.

Before or after decolorization, the plasma may be treated to reduce or remove cholesterol which is present in small amounts that will vary somewhat from specie to specie. And, if it is desirable to add vitamin D, the plasma can be irradiated by ultraviolet light before decholesterolization.

The plasma may be wholly or partially decholesterolized by the addition of oils, pH adjustment, warming and separation, treatment with solvents such as dimethyl ether, and such other techniques as do not result in irreversible denaturization of the plasma.

The preferred decholesterolization method is to add to the plasma a whole or disrupted microorganism or an extract of a microorganism containing cholesterol oxidase and, in some instances, cholesterol esterase or equivalent cholesterol reducing enzymes.

Such enzymes are first added to reduce the cholesterol inherently present in the plasma and are then: (1) inactivated by any of the conventionally available techniques; (2) retained in an active state to continue elimination of cholesterol after adipose tissue is formed and added to meat; or even (3) supplemented. This last approach provides enzymes immobilized on the surface of the adipose tissue in quantities that are effective to provide cholesterol reduction in cholesterol bearing portions of meat upon the artificial adipose being mixed therewith.

Alternatively, the adipose tissue may simply be dipped or sprayed with cholesterol reducing amounts of such enzymes.

Following such processing of the plasma as is deemed appropriate for a given application of the invention, one or more fats or oils are combined with the plasma; and the mixture is emulsified by aggressively mixing its constituents together.

Virtually any fat, edible oil, or other lipid or fat or oil substitute can be used as can endless combinations of such substances. Merely exemplary are: omega-3 fatty acids, vegetable oils, animal fats, synthetic lipids, and the like. Lipids such as high oleic derivatives, canola oil, and the like obtained from genetically modified sources can also be used.

Reduced cholesterol fats and oils, including lard and the like, may be used. Such fats and oils are available and prepared by absorption of cholesterol, cyclodextrin reduction of cholesterol, or steam stripping removal thereof.

It may be advantageous to thicken the fat or oil constituent before it is emulsified with the plasma. This can be accomplished by hydrogenation if the substance has unsaturated bonds or by the addition of about 1%–8% of a saturated fatty acid.

After homogenization, the plasma-based mixture is treated in a manner which will cause the mixture to form a gel. Enzymes, acids, alkaline salts, heat, or polyvalent cations such as calcium can all be added to the mixture to gel the oil/fat-containing emulsion.

Also advantageously incorporated in the mixture, however, is a binder; e.g., a settable vegetable gum such as sodium alginate, which should be mixed into the plasma before fats or oils are added. Sodium alginate is a good emulsifier for oils and fats, adding emulsification capability to the plasma. Alginate, like plasma, will cross-link and gel upon the addition of polyvalent cations, including calcium, to it. Furthermore, the gels thus formed may have many unique properties not possessed by plasma or algin alone; and these may be highly desirable in that they will allow one to form new products heretofore not achievable with either plasma or algin. The combination of the vegetable gum (saccharide) and protein is synergistic and compatible in that both are gelled by calcium ions and the hydrogen ions found in edible acids. While plasma is only gelled by heat, enzymes, and acid in lower pH ranges, the combination may also be gelled by the addition of alkaline salts, such as sodium and potassium carbonates, at a pH above about 11.

Thus, when a polyvalent, cross-linkable gum or hydrocolloid comprised substantially of a saccharide or polysaccharide, such as sodium alginate, gellan gum, high methoxy pectin, or the like, is combined with a co-cross-linkable protein or protein complex, such as plasma, products which have many new and useful properties can be formed. This approach can also be used to provide products heretofore proposed but very difficult or impossible to make.

When mixed in an aqueous system, a combination of co-cross-linkable monomers of fundamentally differing basic structures, at least one of which is an edible, cross-linkable, substantially saccharidaceous monomer and another an edible, cross-linkable, substantially proteinaceous monomer, can provide gels with improved properties. The composite gels can be cross-linked, typically by a cross-linking agent capable of furnishing polyvalent cations (preferably divalent cations of metals such as calcium or iron) and/or hydrogen ions and/or by thermal cross-linking. This results in complex matrices which are comprised of networks of dissimilar copolymers and which exhibit unique properties.

Speaking more generally, the saccharide/protein combination may be gelled by simply providing a cross-linking promoter (heat or chemical agent) for one of the components and then cross-linking the other, simultaneously or separately. It is even possible to cross-link one component to spatially orient and position the other and then dissolve the first component away, leaving a structurally integral matrix with unique capabilities. Or, it may be more advantageous to cross-link the saccharide/protein composite in a series of cross-linking steps. In this way, new films and membranes of greater tensile strength, resiliency, texture, and integrity may be conveniently and easily formulated.

Certain preferred artificial adiposes embodying the precepts of the present invention contain new protein/saccharide compositions of the character just described. Those products are only representative of many heretofore unknown products which may be formulated. Such new and unique products include: integral and non-integral membranes; skins and matrices for covering, enclosing, or capturing other substances and for forming dynamic coagulant gels that can be used to capture, concentrate, and dewater solids from aqueous environments including those containing edible and waste products and animal foodstuffs; and still other new products which may be derived from the new and novel, just-described compositions.

The above-discussed ability of the protein/saccharide compositions disclosed herein to recover solids from aqueous carriers is particularly noteworthy. In the case of waste water, they provide pollution control and make possible the recovery of solids which are valuable animal foodstuffs.

Still another important application of the novel saccharide/protein gels discussed above and hereinafter is as binders and coagulants for edible particles and particles of animal foodstuffs, particularly those edible substances and animal foodstuffs with high fat contents.

As mentioned above, new and valuable films and membranes can be made from the novel protein/saccharide combinations of the present invention.

Algin and other saccharides do not bear up well when employed as liquid-containing membranes. Hydrostatic pressure of the liquid exerts continuous force against the membrane; and polysaccharic, cross-linked membranes simply split apart, allowing the liquid to run free.

Blood, plasma, fibrinogen, and serum albumin do not form integral membranes. Fibrinogen instead forms loosely associated strands or fibers of considerable size in networks which are discontinuous and somewhat like a disorganized spider web. Fluids can freely pass through the irregular and substantial interstices in these networks.

Thus, neither cross-linked saccharides nor blood or its protein fractions are suitable for forming membranes, especially membranes with a high moisture content. Combined, however, they provide a membrane which is strong and quite capable of retaining substantial hydrostatic pressure without leakage of contained liquids.

Plasma from blood is the preferred protein additive, particularly for those protein/saccharide compositions intended for products other than artificial adiposes. Algins and alginic substances, even in crude forms, are the preferred saccharidic substances. However, fresh blood substantially unreacted (except for citrates and the like to prevent clotting) or substantially unreacted extracts thereof, such as fibrinogen or, less preferably, serum or other albumin, may be used. And cross-linkable gums and hydrocolloids analagous to alginates, such as gellan gum, highly substituted carboxymethyl celluloses, and such may be used to replace all or part of the algin.

Another very important, although optional, aspect of the present invention is in augmenting the alginate preferably employed in gelling the mixture from which an adipose tissue is formed with additional or supplementary gelling or non-gelling gums of high water capacity. This produces an artificial adipose product capable of increasing the juiciness of meat after preparation. Examples of suitable gums include guar, locust bean, acacia, ghatti, Arabic, carrageenan, and the like. These have been proven to prevent hypercholesterolemia (excess cholesterol) when eaten with foods containing cholesterol and contain what is referred to as soluble dietary fiber. Therefore, the uses of these gums as artificial adipose forming aids and as supplements in the artificial adipose to increase juiciness are also beneficial since their presence will: (a) result in metabolic protection from the cholesterol contained in the meat and meat juices in contact with the artificial adipose, and (b) further result in a significant portion of the cholesterol being excreted after ingestion rather than being digested and sorbed into the body. Consequently, if the lipids contained in either the artificial adipose or the meat with which the artificial adipose is mixed contain cholesterol, it will be favorably influenced to bypass the digestive process.

Alternates that may in whole, or in part, be substituted for the materials described in the preceding paragraph in the practice of the present invention include thermoreversibly gellable proteins and starches which have been pregelatinized or can be gelled at a low temperature. Useful proteins are gelatin and collagen; useful starches are corn, tapioca, and rice.

Starches as described in the preceding paragraph can be used at cold-to-ambient temperatures to impart the decided upon structure or consistency to an artificial adipose embodying the principles of the present invention.

The gellable protein or starch that is employed should also be one which, in combination with other ingredients of the adipose in which it is incorporated, will contribute to opacity when the adipose is cold or at ambient temperature and either become clear or not keep the adipose from becoming more transparent above about 38° C. In other words, the protein starch should either contribute to typical visual changes in normal adipose as it is heated or at least not interfere with that change in appearance.

Lecithins are lipids which can be employed to particular advantage. These compositions have the capacity of altering the tack of the artificial adiposes in which they are incorporated to the point where the artificial adipose will closely resemble its natural counterpart in such tactile sensations as mouth feel.

It is quite possible to use compositions other than alginates, alginate/plasma combinations, and plasma proteins to gel the oil or fat emulsion. Alternate, appropriate gelling agents include highly substituted carboxymethyl celluloses, low methoxy pectins, gellan, and the like. Typically, these alternative gelling agents contain soluble dietary fiber as do alginates themselves. Therefore, the gelling agents, as well as the non-gelling agents, can be relied upon to provide juiciness and to inhibit the absorption of cholesterol.

As is apparent from the foregoing, an artificial adipose formulated in accord with the principles of the present invention may be as simple as a carefully prepared emulsion of blood plasma and one or more unsaturated fats or oils. Or it may be a more complicated complex of, for example, a decolorized plasma; a gellable vegetable gum; an active decholesterolizing agent; an unsaturated, decholesterolized, synthetic fat or oil constituent; polyvalent cations; and/or a proteolytic or cholesterolytic enzyme or enzyme source.

The artificial adipose mixture can be poured, cast into forms or films, or extruded. For pourability, it can first be mixed with a sequestrant such as sodium hexametaphosphate, sodium citrate, or the like; a slow release acid such as adipic acid; and a non-soluble or slowly soluble salt of calcium such as calcium sulfate. After the resulting mixture is poured, it will set into a gel in from a few minutes to several hours, depending on the relative ratio and concentration of added ingredients. It may then be passed through a cutter or chopper and formed into suitable shapes to mimic the natural adipose tissue of the meat to which it is to be added.

Instead of being poured, the plasma-based mixture from which the artificial adipose tissue is formed may be extruded into a bath containing one or more gelling agents or extruded and formed during extrusion by addition of one or more gelling agents.

The meat of low fat content which is to be supplemented with the artificial adipose tissue is first prepared by trimming away all removable natural adipose tissue The meat is then comminuted as in a Hobart meat grinder. The artificial adipose tissue, formed and dehydrated to the desired concentration of water, may be added to meat just prior to grinding.

When meat containing the thus incorporated artificial adipose tissue is cooked, the plasma will exhibit the same strong flavor, taste, and aroma as the meat of the animal from which the plasma was derived.

The formation of a low cholesterol and/or low saturated fat meat product with an artificial adipose as just described results in a product which is significantly superior to any that can be obtained by mixing an unsaturated, low cholesterol or cholesterol-free fat or oil with lean, comminuted meat. The product obtained by merely mixing in the fat or oil does not look like normal raw sausage or hamburger, for example. And, during cooking, all of the fat or oil runs out at one time, resulting in an abnormally crumbly and powdery meat product with an oily surface. In addition, if the product is prepared near or around an open flame, the fat or oil thus freed essentially all at once as the meat product cooks presents a significant fire hazard.

The addition of a vegetable gum such as guar, locust bean, xanthan, carrageenan, agar, sodium alginate, or the like to emulsify the refined fat or oil and improve retention of the fat or oil after distribution in meat does not result in a product which is any better. The result of this approach is a pasty appearing meat which is pink rather than meat colored, sticky to the touch, still permits melted fat to escape freely when cooked, and does not have a normal taste or mouth feel.

Likewise, if an emulsion of a gellable gum, such as sodium alginate, and a refined fat or oil is made and combined with the meat and polyvalent cations are then added to create an adipose/meat gel, the results are no better. This results in a product which looks more or less like an aspic rather than ground or otherwise comminuted meat. Even if the fat or oil/emulsifying agent mixture is prepared separately and then ground with meat, the meat product still appears abnormal. Also, much of the fat or oil will leak from the mixture, which makes the ground meat soft and oily.

WORKING EXAMPLES

The simplest form of artificial adipose embodying the principles of the present invention is described in the following example:

EXAMPLE 1

| Ingredients: | |
|---|---|
| Fresh pork plasma | 1,000 mls |
| Hydrogenated corn oil | 100 gms |
| Lecithin | 5 gms |
| Calcium chloride | 2 gms |
| Proteolytic enzyme (trypsin, pepsin, or the like) | 0.001 gm |
| Hydrochloric acid | to pH 3–3.5 |

All ingredients except the calcium chloride are mixed together in a high speed blender and heated to a temperature of 38°–42° C. After mixing for about 5 minutes, the hydrochloric acid is added until a pH of between 3 and 3.5 is reached. The mixture is mixed for a few to several seconds and then allowed to set. The solids which form are skimmed off with a wire mesh strainer and rinsed with one or two volumes of pH neutral water. Next, excess water is shaken free. The artificial adipose that results may be dried for storage and subsequently used or mixed—as is or after having been reduced some in size; e.g., by comminution—with meat to make sausage.

This product is more fragile than others described in examples which follow. Shrinkage on cooking is considerable since no hydrophilic ingredient is present to sorb meat fluids. However, it is very strong in flavor when cooked because the ratio of plasma to dry ingredients and lipids is high.

EXAMPLE 2

| Ingredients: | |
|---|---|
| Pork blood plasma liquid | 1,000 mls |
| Sodium alginate L.V. | 18 gms |
| Partially hydrogenated safflower oil | 1,000 gms |

The sodium alginate is blended with the plasma in a high speed blender for about 10 minutes. Then, the safflower oil is added and emulsified by blending in the high speed blender at a temperature above the melting point of the hydrogenated oil (about 32° C.) but below the gelation temperature of the plasma (38°–60° C.).

The resulting slurry is placed in an extruder and extruded in strings about ⅛ to 3/16 inch in diameter into a bath warmed to a temperature above the coagulation point of the plasma (about 38°–60° C.) and prepared by adding to water sufficient hydrochloric acid to drop the pH to about 3.5–4.5 and by dissolving about 1–1.5% by weight of calcium chloride in the water.

The strings are "set" by the action of the acid and calcium ions on the alginate and on fibrinogen contained in the plasma phase of the slurry. The safflower oil is captured in interstices of the complex cross-linked gel formed as the strings or ribbons of adipose tissue are set.

The temperature of the bath can be raised to above about 59° C. to also thermally "set" fibrinogen and/or albumins in the plasma. This makes the finished strings somewhat firmer. In any event, the "set" product is rinsed in several volumes of warm water for about 5 minutes and then collected. Free water is then drained away.

The product may be dried by forced air or used as is after the rinse step.

This product has the same appearance, taste, flavor, and aroma as the natural adipose contained in pork after it is chopped into pieces and mixed with lean pork meat to product pork sausage.

If algin and fat had been used alone; i.e., without the blood plasma, the artificial adipose product would have been flavorless; and most of the lipid phase would leak to the outside surface of the product in the event that an emulsion could even be obtained by blending the ingredients in the proportions suggested.

Alginate is not a sufficiently effective emulsifier to cause the formation of a good emulsion, and an additional emulsifier must therefore typically be added. The plasma further performs this function in admirable fashion because the fibrinogen and albumin fractions of blood plasmas are both reactionable proteins, making the plasma a superb emulsificant for oils or fats added later to produce artificial adipose tissue. In addition the foregoing blood plasma fractions gave the advantage of multifunctionality. That is, in addition to the emulsifying properties and "real meat" flavor it provides, the combination of albumin and fibrinogen is of substantial value from the viewpoint of the structural properties it adds to the adipose and the rigid shell that is left behind when the artificial adipose is heated.

Fibrinogen, in conjunction with an algin containing substance, only needs the addition of sufficient calcium cations or the equivalent to cross-link and gel. Heat; proteolytic enzymes such as trypsin; edible acids; and alkaline salts such as sodium carbonate, sodium phosphate, and the like can all be used to promote the gelling of the fibrinogen; or the prothrombin already present in the complex may alone be sufficient to produce strong cross-linking.

The associated albumin can also be caused to cross-link to help in forming the gel, in this case by the use of edible acids, enzymes, or heat.

If algin and fat had been used alone, the product would have had almost no flavor, taste, or aroma due to the inadequate contribution made by the lean meat. The plasma provides these functions. Furthermore, the fibrinogen in the plasma provides additional structural advantages when coagulated or "set" with the alginate and provides adequate body, toughness, and structured interstices for the lipid. Moreover, when heated to 38°-60° C., the fibrinogen and/or albumin coagulate, contributing additionally to the toughness of the artificial adipose and making it more closely resemble natural adipose.

On frying, the adipose browns like bacon or suet adipose; gives off an aroma characteristic of the meat from which the plasma in the adipose is obtained; and releases some lipid.

Sausage made with ground lean pork and adipose prepared as described in this example looks, tastes, smells, and cooks like sausage made with natural adipose.

EXAMPLE 3

| Ingredients: | |
|---|---|
| Fresh fluid plasma | 900 mls |
| Gelatin powder (300 Bloom*) | 72 gms |
| Gellan** | 18 gms |
| Lecithin | 7 gms |
| Canola (rapeseed) oil | 500 gms |
| Glyceryl monostearate | 25 gms |

*Bloom is a measure of the viscosity of a gel.
**Gellan gum is a high-molecular weight heteropolysaccharide produced by fermention of a pure culture of *pseudonomas cledes*. It is supplied by the Kelco Division of Merck & Co., Inc., Rathaway, N.J.

The lipids—lecithin, canola oil, and glyceryl monostearate—are heated to between 45° and 70° C. to melt the glyceryl monostearate, then blended in a dough mixer or the equivalent. Separately, the gellan is blended in a large food chopper with the fresh fluid plasma warmed to between 30° and 35° C. until completely distributed and mostly rehydrated (about 10 minutes). The 300 Bloom gelatin powder is added to this mixture and very briefly mixed in to distribute it (care should be taken to restrict air entrainment). The lipid mixture is then added with gentle mixing to the plasma mixture. The oil mixture is added in this fashion before the resulting mixture is aggressively agitated in order to bring about complete emulsification of the lipid and plasma mixture.

The resultant emulsion is extruded by pumping it with a slurry pump through a nozzle having a diameter between ⅛" and 3/16" into a setting bath. This bath is made up of 5,000 mls of scalding hot water, between 85° and 90° C., which contains 75 gms of dissolved calcium chloride and is adjusted to a pH of 3.5 to 4 by an edible acid such as hydrochloric.

The gelatin or albumin solids in the formula can be replaced with plasma or even fibrinogen or other similar protein solids provided they have not been denaturized; and a starch which has been pregelatinized and can be gelled at a low, preferably ambient temperature or a comparable material may be used, as discussed above, to assist in imparting the wanted consistency to the artificial adipose and to enhance the ability of the adipose to mimic the change in color undergone by a natural adipose as that adipose is heated. Representative starches are identified above. Comparable materials for the purposes of the present invention include dextrin and cyclodextrin. The glyceryl monostearate, which is used to thicken the canola oil and keep it from running out of the product at ambient temperatures, may be replaced with stearyl lactylate or any other suitable monoglyceride.

The following example describes an artificial adipose which can be used to provide a greater degree of juiciness in prepared meat.

EXAMPLE 4

| | |
|---|---|
| Fresh fluid plasma | 1,000 mls |
| Corn gluten (vegetable proteins) | 80 gms |
| Sodium alginate L.V. | 15 gms |
| Lecithin | 7 gms |
| Safflower oil | 300 gms |
| Palm oil | 300 gms |

-continued

| | |
|---|---|
| Glyceryl monostearate | 8 gms |
| Locust bean gum | 5 gms |
| Xanthan gum | 5 gms |

The lipids—lecithin, canola oil and glyceryl monostearate—are heated to between 45° and 70° C. to melt the glyceryl monostearate and blended in a dough mixer or the equivalent. Separately, the alginate is blended in a large food chopper with the fresh fluid plasma warmed to between 30° and 35° C. until completely distributed and mostly rehydrated, about 10 minutes. The gluten, xanthan gum, and locust bean gum are added to this mixture and very briefly mixed in to distribute them (care should be taken to restrict air entrainment). The lipid mixture is added before the resulting mixture is aggressively agitated in order to bring about complete emulsification of the lipids and plasma.

The resultant emulsion is extruded as described in Example 3.

The gluten in the formula can be replaced with plasma solids or even fibrinogen, collagen, soya protein or isolates, fish paste, surimi batter, or other similar protein solids, provided they have not been denaturized. The glyceryl monostearate may be replaced with stearyl lactylate or other suitable monoglyceride to thicken the canola oil at ambient temperatures.

Locust bean and xanthan gums are used in this formulation to provide beneficial, soluble, dietary fibers. Xanthan gum also contributes to the stability of the emulsion in which it is incorporated. The consequence is that flavoring agents are less apt to run out of the artificial adipose made from the emulsion when the artificial adipose is heated The same is true of hydrophilic constituents of the artificial adipose, and that is important as it results in the product in which the adipose is incorporated staying juicy as it is cooked. To provide the greatest possible concentration of soluble dietary fiber in the adipose is heated. The same is true of hydrophilic con- lower viscosities are preferably employed. For example, acacia gum and algin react to form a thin, runny gum. Acacia gum does not have a high viscosity to start with and is a good gum to use if a lower viscosity is needed.

Irrespective of the gum that is selected, it should be one which, in the amount used, has a taste level below that noticeable in the artificial adipose.

EXAMPLE 5

| Ingredients: | |
|---|---|
| Fresh fluid plasma | 2,000 mls |
| Collagen | 80 gms |
| Sodium alginate L.V. | 15 gms |
| Lecithin | 10 gms |
| Canola oil | 600 gms |
| Glyceryl monostearate | 8 gms |
| Gum ghatti | 10 gms |

The lipids—lecithin, canola oil, and glyceryl monostearate—are heated to between 45° and 70° C. to melt the glyceryl monostearate and blended in a dough mixer or equivalent. Separately, the alginate is blended in a large food chopper with the gum ghatti and the fresh fluid plasma warmed to between 30° and 35° C. until completely distributed and mostly rehydrated, about 10 minutes. The collagen is added to this mixture and very briefly mixed in to distribute it. The lipid mixture is added, and the resulting mixture is thereafter aggressively agitated to emulsify the constituents of the mixture. Gentle mixing is used before the emulsion forming plasma and lipid mixtures are aggressively agitated in order to bring about complete emulsificiation.

The resulting emulsion is extruded and set in the manner described in Example 3.

Solids are more concentrated in artificial adiposes prepared by the technique described in this example. This contributes strength to the artificial adipose, making it more suitable for use with firmer comminuted meats such as ground beef.

The collagen solids in the formula can be replaced with plasma or even fibrinogen or other similar protein solids, provided they have not been denaturized. The glyceryl monostearate, which is used to thicken the canola oil and keep it from running out of the product at ambient temperatures, may be replaced with stearyl lactylate or any other suitable monoglyceride.

So far, the working examples have dealt with the preparation of artificial adiposes embodying the principles of the present invention. The following examples are concerned with both the preparation of an artificial adipose of that character and the preparation of a meat product in which the adipose is incorporated.

EXAMPLE 6

| Ingredients: | |
|---|---|
| Beef blood plasma | 300 mls |
| Sodium citrate (sequestrant) | 3 gms |
| Unsaturated oil, melted saturated fat, decholesterolized oil or fat, or oil or fat analogue – for example, any of those identified in this specification and mixtures thereof | 300 gms |
| Sodium alginate L.V. | 9 gms |
| Cholesterol esterase, 1:50 | 14 units |
| Cholesterol oxidase, 1:70 | 15 units |
| Bath: | |
| Water, pH 6.5–7.5 | 500 mls |
| Calcium chloride | 7.5 gms |

To 400 gms of blood taken from a freshly slaughtered beef cow is added 3 gms of sodium citrate (or sodium phosphate or the like). The blood and citrate are shaken together to insure complete distribution of the citrate throughout the blood. The blood is immediately chilled and kept cool throughout the following procedure.

The blood is centrifuged at 2,700 rpm for 20 minutes The centrifugate layer, about 100 gms, is deep red, indicating that red blood cells have been captured in this layer. The supernatant plasma, about 320 mls, is decanted. To the plasma is added 1% by volume of a 30% concentration of hydrogen peroxide. The oxygen molecule attached to the peroxide is enzymatically released by catalysts in the plasma. As the nascent oxygen is released, it bleaches the plasma first to brown and then to a light amber.

The bleached fluid is formed into a film and passed in close proximity to an ultraviolet source. By this irradiation, vitamin $D_3$ is generated from its provitamin, 7-dehydrocholesterol, in the plasma.

To the fortified plasma is added in a measured 1 cc syringe 15 units of a 1:50 dilution with water of cholesterol esterase and 15 units of a 1:70 dilution with water of cholesterol oxidase.

The mixture is placed in a food chopper, and 5 gms of sodium alginate L.V. (low viscosity, 60–300 cps) is added. The chopper is turned on intermittently (pulsed) for about 2 minutes and then run continuously for 10 minutes.

To the blended mixture is added 300 mls of an unsaturated, saturated, decholesterolized, oil such as corn oil, safflower oil, or the like (or a decholesterolized, liquified fat or a fat or oil analogue) while the mixer is running. The blender is run for 10 additional minutes or until all ingredients are completely emulsified.

The mixture will now turn from a slight off white color to very light pink.

A bath containing 500 mls of water, pH from 6.5 to 7.5, is warmed to 37° C.; and 7.5 gms of calcium chloride (CaCl$_2$) is added. The water is circulated by a small pump or placed in a flat bottomed tray equipped with a magnetic stir bar operated to cause a somewhat vertical movement of the water in the bath.

The emulsion is pumped into the bath to form continuous strings, each 3/16th of an inch in diameter. The strings resemble spaghetti.

The strings are allowed to set in the bath for at least 15-20 minutes. They are then removed and shaken until all excess water is removed. Then, they are placed in a direct air flow to partially dry them. This lowers the moisture content of the strings and raises the oil content.

Into a large stainless steel mixing bowl, such as that attached to a Kitchen-Aid ™ dough mixer, are separately added 500 gms of very lean beef, which has been coarsely chopped, and 100 gms of the artificial adipose tissue. Using a mixing paddle, the chopped meat and artificial adipose are stirred together for 3 minutes at high speed. This breaks up the strings of adipose and distributes the adipose more-or-less uniformly throughout the meat.

The resulting hamburger product is put through a meat chopper to create the coarseness desired. When pan fried or char broiled, the cooked product is moist and tasty; and it will retain its moistness and flavor for up to 1 hour in a warming tray.

EXAMPLE 7

| Ingredients: | |
|---|---|
| Dried beef plasma | 120 gms |
| Water | 900 gms |
| Gellan | 15 gms |

Mix the plasma and water together in a bowl using an egg beater until the plasma is dissolved; and then add the gellan.

Mix with the egg beater for about 5 minutes. Heat the resulting mixture to a temperature in the range of 30° to 40° C.

| Add (warmed to 50° C.): | |
|---|---|
| Decholesterolized tallow | 200 gms |
| Peanut oil | 350 gms |
| Stearyl lactate | 10 gms |
| Lecithin | 10 gms |

Mix with the egg beater for 10 minutes or until all ingredients are completely emulsified.

Transfer the emulsion to a stainless, flat bottomed, 4-quart pan which has had holes of ⅛ to ¼" diameter drilled in an equispaced pattern in its bottom and which has been placed approximately 2" above an agitated tray which is approximately 10"×18"×4" deep and contains an aqueous setting bath. This bath contains 3,000 mls of water heated to 35°-40° C. to which has been added 30 gms of calcium chloride and sufficient hydrochloric acid to provide a pH of 4 to 4.5.

A rubber spatula is used to force the emulsion through the holes in the pan into the center of the tray.

The resulting strings of artificial adipose are removed from the setting bath, rinsed, drained in two to three volumes of clean water until surface free of excess water, and coarsely chopped until about the size of normal beef adipose particles. To very lean beef (less than 9% lipid), comminuted to hamburger sized particles, is added the desired amount of artificial adipose. In a vertical mixer the ground meat and artificial adipose are blended together until thoroughly mixed. The meat product is pressed into steaks or patties for preparation.

EXAMPLE 8

| Ingredients: | |
|---|---|
| Part A: | |
| Lean meat | 40.0 gms |
| Plasma liquid | 300.0 mls |
| Dibasic sodium phosphate | 1.0 gms |
| Ammonia | 2.5 mls |
| Part B: | |
| Plasma solids (hydrolyzed beef, pork, etc.) | 24.0 gms |
| Sodium alginate (or gellan, low methoxy pectin, high degree of substitution carboxy methyl cellulose, etc.) | 12.0 gms |
| Part C: | |
| Corn oil (or any other edible oil or fat or analogue thereof) | 300.0 mls |
| Glyceryl monostearate | 10.0 gms |
| Salt | 6.5 gms |
| Lactic acid | to a pH of 6.2-6.5 |
| Part D: | |
| Water (*plasma) | 2,000.0 mls |
| Calcium chloride | 40.0 gms |
| Lactic acid | to a pH of 5 |

Plasma adjusted to a pH of 5.0-5.5 with lactic acid can be used for the bath instead of water to make the taste and flavor exact for hamburger. This is not recommended for other meats such as pork, turkey or fish. The plasma prevents dilution of the artificial adipose due to leakage of its plasma constituent into the bath while it is being set if a low temperature bath is used.

Procedure:

Part A: In a high speed blender, add all Part A ingredients in the order given. Blend at high speed until the meat forms a thick, pink slurry with no free meat particles showing.

Part B: Add the Part B ingredients in the order given to the meat slurry. Blend until the alginate is completely dissolved and rehydrated (no free granules showing in a drop under a microscope). This will take 5 to 15 minutes. Turn the blender off. Leave the blended ingredients in the blender container.

Part C: In a separate container, warm the oil approximately 40°-45°. Using a whisk or hand held mixer, mix in the glyceryl monostearate until it is completely dissolved. Then turn on to high speed the blender containing the Part A and Part B ingredients, and slowly add the Part C ingredients. Mix until all ingredients are completely emulsified together, about 3-5 minutes. During the last 30 seconds, add the salt, blending for 30 seconds to completely distribute the salt. Add the lactic acid, and adjust the pH of the mixture to a pH in the range of 6.2-6.5.

Part D: In a standing glass tray, approximately 14"×8"×2.5", place 2,000 mls of tepid water (32°-35° C.) or blood plasma. Adjust the pH of the bath to 4. Add 40 gms of calcium chloride. Stir until dissolved.

Add the mixture of Parts A, B, and C to a cake decorating pouch with a ⅛ to ⅜ inch diameter nozzle. Squeeze the filled pouch with the nozzle just below the surface of the bath while moving the nozzle back and forth, making a long, continuous string of loops, until the contents of the pouch are completely extruded. Let the string set for 14 to 20 minutes. Remove the artificial adipose string from the bath. Shake free of excess water. Rinse with 2 or 4 volumes of water. Set on a dry surface and allow to dry for 2 hours.

Chop the string into pieces the same size as lean ground meat. Mix the adipose with the meat by hand or with a small dough mixer until blended. Form patties.

EXAMPLE 9

The foregoing, Example 8 procedure can be modified so that no bath is required. The product which results can be cast into a film, dried, and chopped into appropriately sized particles.

To proceed without a bath, the following, alternate Part D ingredients and procedure are employed in place of the bath.

Alternate Part D:
Blocker for alginate to prevent 1.00 gm cross-linking, such as sodium hexametaphosphate
Bound calcium source, such as 3.25 gms calcium sulfate
Weak acid source, such as 1.50 gms adipic acid To a mixture of Parts A, B, and C, while still in the blender, add the alginate blocker (the first ingredient of Alternate Part D). When the blocker is thoroughly mixed in, add and mix in the bound calcium source (second ingredient of Alternate Part D). Then add the slow acid source (third ingredient listed for Alternate Part D), blend quickly, and immediately pour the blended contents into a flat bottomed pan to make a thin layer, ⅛" to ⅜" thick. Allow to set for at least one hour into a solid gel. Chop the gel in a food chopper to the size of the natural adipose particles in the specie of meat with which the adipose is to be mixed. Blend the artificial adipose into lean ground meat. Make into loafs or patties.

The adipic acid may be decreased or increased with respect to the Part D formulation, and the sodium hexametaphosphate blocker may be increased or decreased with respect to the adipic acid to hasten or slow gelling. Gelling occurs in the procedure described in this example because the adipic acid first neutralizes the gelation blocking ammonia and hexametaphosphate and then reacts with the calcium sulfate, slowly releasing polyvalent cations. These cross-link the alginate moities to form a gel from the emulsion.

The foregoing artificial adipose is added to very lean beef in the amount needed to make the total fat content of the resulting hamburger product 25 weight percent, which is comparable to the fat content of hamburger meat used by commercial establishments. The total fat content is made up of 8% natural beef adipose and 17% artificial adipose. Thus, the total cholesterol content of the meat product of the present invention is at least 50% lower than that of beef containing natural adipose at an equivalent lipid-to-meat concentration. The total saturated lipids are furthermore substantially reduced by about one-third.

Several new fat and oil replacer products have been developed and are expected to come to market. These and comparable products hereafter developed to replace fat or oils may be used alone or in combination with other fat or oil replacers in making artificial adiposes embodying the principles of the present invention.

Also, it was pointed out above that there are a number of processes for removing cholesterol and/or saturated oils or fats from various foodstuffs. Various ones of these treated products can also be employed in the artificial adipose-containing foodstuffs of the present invention in the interest of reducing the cholesterol and/or saturated fat contents of those products.

Furthermore, it will be apparent to the reader from the foregoing that the proteins in blood plasmas can be replaced with other hydrolyzed proteins in making an artificial adipose embodying the principles of the present invention and that there are a number of binders aside from sodium alginate that can be used.

It is of course not necessary that the precise proportions of ingredients identified in the working examples be used in preparing artificial adiposes by the procedures described in these examples. Instead, useful products will be obtained as long as those ingredients are kept within the limits tabulated below.

|  | Acceptable Range | Preferred Range |
| --- | --- | --- |
| Example 1: | | |
| Fresh pork plasma | 20.000-99% | 70.000-80.00% |
| Hydrogenated corn oil | 5.000-90% | 50.000-70.00% |
| Lecithin | 0.000-10% | 2.000-7.00% |
| Calcium chloride | 0.001-5% | 0.010-1.00% |
| Hydrochloric acid | 0.000-3% | 0.001-0.01% |
| Proteolytic enzyme (trypsin, pepsin, erepsin, or the like) | 0.000-.001% | 0.0001-0.001% |
| Example 2: | | |
| Pork blood plasma (liq.) | 20.000-99% | 40.000-70.00% |
| Sodium alginate L.V. | 0.100-5% | 0.750-2.00% |
| Partially hydrogenated safflower oil | 10.000-90% | 40.000-60.00% |
| Example 3: | | |
| Fresh fluid plasma | 20.000-90% | 40.000-60.00% |
| Gelatin powder (300 Bloom) | 10.000-90% | 30.000-50.00% |
| Sodium alginate L.V. | 0.100-5% | 0.750-2.00% |
| Lecithin | 0.000-5% | 0.500-2.00% |
| Canola oil | 10.000-90% | 30.000-60.00% |
| Glyceryl monostearate | 0.000-5% | 0.500-2.00% |
| Example 4: | | |
| Fresh fluid plasma | 10.000-90% | 30.000-60.00% |
| Gluten (corn) | 1.000-70% | 5.000-20.00% |
| Sodium alginate L.V. | 0.100-5% | 1.000-2.00% |
| Lecithin | 0.000-8% | 0.500-2.00% |
| Safflower oil/palm oil mixture | 10.000-90% | 40.000-60.00% |
| Glyceryl monostearate | 0.000-8% | 0.500-2.00% |
| Locust bean gum | 0.000-6% | 0.010-1.00% |
| Xanthan gum | 0.000-6% | 0.010-1.00% |
| Example 5: | | |
| Fresh fluid plasma | 10.000-90% | 30.000-60.00% |
| Dry albumin | 0.000-50% | 5.000-10.00% |
| Sodium alginate L.V. | 0.100-5% | 0.750-2.00% |
| Lecithin | 0.000-8% | 0.500-2.00% |
| Canola oil | 10.000-90% | 20.000-50.00% |
| Glyceryl monostearate | 0.000-8% | 0.500-2.00% |
| Gum ghatti | 0.000-8% | 0.010-2.00% |
| Gum Arabic | 0.000-8% | 0.010-2.00% |

-continued

| | Acceptable Range | Preferred Range |
|---|---|---|
| Example 6: | | |
| Plasma (beef blood) | 10.000–90% | 30.000–60.00% |
| Sodium citrate | 0.010–5% | 0.750–1.50% |
| Unsaturated oil, melted saturated fat, decholesterolized oil or fat, or oil or fat analogue – for example, any of those identified in this specification and mixtures thereof | 10.000–90% | 30.000–60.00% |
| Sodium alginate | 0.100–5% | 0.750–2.00% |
| Cholesterol esterase | .00001–.10% | 0.0001–0.001% |
| Cholesterol oxidase | .00001–.10% | 0.0001–0.001% |
| Bath, water | 90.000–99.9% | 98.500–99.25% |
| Bath, calcium chloride | 0.010–5% | 0.750–1.50% |
| Example 7: | | |
| Dried beef plasma | 1.000–20% | 8.000–12.00% |
| Water | 80.000–99% | 88.000–92.00% |
| Gellan | 0.000–10% | 0.750–3.00% |
| Decholesterized tallow | 0.000–90% | 20.000–50.00% |
| Peanut oil | 0.000–90% | 30.000–60.00% |
| Stearoyl lactylate | 0.000–8% | 0.050–2.00% |
| Lecithin | 0.000–8% | 0.050–2.00% |
| Examples 8 and 9: | | |
| Part A: | | |
| Lean meat | 0.000–30% | 8.000–15.00% |
| Plasma liquid | 20.000–90% | 70.000–85.00% |
| Dibasic sodium phosphate | 0.100–5% | 0.750–1.00% |
| Ammonia | 0.000–5% | 0.750–1.00% |
| Part B: | | |
| Plasma solids | 1.000–30% | 8.000–12.00% |
| Sodium alginate | 0.100–8% | 0.500–2.00% |
| Part C: | | |
| Corn oil | 10.000–90% | 20.000–70.00% |
| Glyceryl monostearate | 0.000–8% | 0.500–2.00% |
| Salt | 0.000–8% | 0.500–2.00% |
| Lactic acid | 0.000–3% | 0.0001–.01% |
| Part D, bath: | | |
| Water | 90.000–99.9% | 98.500–99.00% |
| Calcium chloride | 0.010–5% | 0.010–1.50% |
| Lactic acid | 0.00001–3% | 0.0001–.001% |
| Alternate Part D: | | |
| Blocker for alginate | 0.0001–2% | 0.01–.50% |
| Bound calcium source | 0.0001–2% | 0.01–1.50% |
| Weak slow acid source | 0.0001–2% | 0.01–.75% |

Of the ingredients in each formulation, the hydrolyzed sacroplasmic protein, oil/fat, and binder constituents are employed in the following proportions:

| Constituent | Range (Dry Weight Percent) |
|---|---|
| Sacroplasmic protein | 3–20 |
| Oil/fat | 50–98 |
| Binder (optional) | 1–20 |

Noteworthy is the fact, made evident by the foregoing table, that products embodying the principles of the present invention may be formulated with very high concentrations of lipids and lipid analogues. This, also above-discussed, ability of the protein/saccharide systems in those products to stabilize aqueous systems of high fat content is particularly important as it can be taken advantage of to produce finished, high fat content particles which provide for the long sought "bypass" feeding of fats to ruminant animals, a functional characteristic not heretofore available.

Another set of artificial adiposes embodying the principles of the present invention is particularly advantageous because these artificial adiposes become clear or transparent when heated to the temperatures used in cooking the meats with which they are mixed. As a result, the cooked or prepared product most closely resembles its counterpart with natural adipose (which also turns clear as it is heated).

Unlike natural adiposes, those just described may to some extent remain in particulate form in the cooked product. This, however, is not a disadvantage and may even be advantageous. These particles are not visible because of their transparency; and they may contribute significantly to the juiciness of the prepared product while natural adiposes to a large extent liquify and run out of the meat as it is cooked, leaving a dry product with poor mouth feel.

The following example is devoted to artificial adiposes of the character just described.

EXAMPLE 10

| Ingredient | Presently Preferred | Range (Dry Weight Percent) |
|---|---|---|
| Hydrogenated soya oil | 120 gms | 50–200 gms |
| Coconut oil | 80 gms | 50–200 gms |
| *AMP-600 TM | 12 gms | 5–20 gms |
| Sodium alginate L.V. | 4.5 gms | 2–10 gms |
| Tapioca flour | 10 gms | 0–15 gms |
| Water | 250 gms | 100–500 gms |
| Diacetyl (2,3-butanedione) | 0.0001 gms | 0–0.01 gms |
| Monobasic sodium phosphate | 1.00 gms | 0–5.00 gms |
| Dibasic sodium phosphate | 1.00 gms | 0–5.00 gms |
| Hot Bath: | | |
| Lactic acid | as required to adjust the PH of the bath to 4.0 | pH 3.0–7.0 |
| Calcium chloride | 1.25 gms | 0.1–50 gms |
| Water | 4,000 mls at 90–95° C. | 500–10,000 mls at 30–100° C. |

*AMP-600 is a spray dried blood plasma available from American Meat Protein Corporation, Ames, Iowa.

Diacetyl contributes to the natural odor of wholesome, fresh beef. It is a high volatile ketone which is somewhat to entirely absent from plasma or AMP-600. It is added in judicious amounts to "round out" the natural flavor profile of artificial adipose so that the meat product in which that adipose is included will closely resemble its natural counterparts.

The caramel (or other coloring agent) is added to give the adipose an "off white" color not unlike that of natural adipose (which may vary from grayish white or even pink or red stained).

The coconut oil and hydrogenated soya oil, although partially saturated, are used to provide melting characteristics similar to those of natural beef or pork adipose.

Dibasic sodium phosphate and monobasic sodium phosphate or sodium glutamate may be added to provide smooth emulsification and/or flavor amplification of all ingredients.

An emulsion is prepared from the foregoing ingredients, generally as described in Examples 1–8. This emulsion is extruded into the bath, typically in ribbons which are 15–25 mm wide and 2–8 mm thick and in the manner discussed above. These ribbons are left in the bath for 5–10 minutes, then drained and lightly salted with sodium chloride for taste enhancement.

From 0.2 to 2.0 gms of cholesterol reductase, cholesterol oxidase, or cholesterol esterase is added to the drained and salted ribbons. The enzyme reacts with the cholesterol present in even the leanest of beef, pork, and other meats to further reduce the cholesterol content of the meat.

The adipose is dried with forced air at about 38° C., then chopped into pieces and mixed with comminuted meat.

In the protocol just described, the bath is preferably kept at a temperature of 58° C or higher. This is done to gelatinize the tapioca and to cross-link the plasma.

The artificial adipose described in this example turns clear when heated to above about 108°-110° C. As a result, this artificial adipose melts somewhat like natural adipose; and the lipids change from milky to clear. The gelantinized tapioca is clear, and the plasma does not occlude the adipose pieces. Thus, the adipose becomes transparent throughout the meat as the meat is cooked, seeming to disappear naturally. Unlike natural adipose, many of the adipose pieces remain as particles, though invisible because of transparency. As discussed above, this results in the cooked meat with which the adipose is mixed retaining juiciness which is otherwise normally lost as juices drain from the cooking meat.

Fresh ground beef containing less than 9% fat was separated into one 85 gm sample and one 100 gm sample and chilled.

Artificial adipose produced as described in this example and dried to about 5% moisture content (15 gms) was chopped into approximately 2-4 mm pieces resembling in appearance the chopped adipose naturally distributed in ground beef of approximately 23% fat content. The chopped adipose was chilled and mixed with the 85 gm sample of beef chilled chopped beef until evenly distributed, forming a second 100 gm sample. Both 100 gm samples were formed into patties and analyzed. The results were: the 100 gms chopped beef sample contained 69 mgs of cholesterol, and the 100 gms sample with chopped beef and artificial adipose contained 15.5 mgs of cholesterol. The patty containing artificial adipose was, therefore, reduced in cholesterol by 78%.

Blind tests have demonstrated the superiority of applicants' novel meat products over their conventional counterparts. In these tests, a hamburger product (NUTRABURGER) prepared in accord with the principles of the present invention and containing an artificial adipose as disclosed herein was compared with regular hamburger and lean hamburger.

The NUTRABURGER product had a total fat content of 23% with 14.5% of that fat being supplied by the artificial adipose. It was prepared as described in Example 10 and formulated as set forth in that table under the heading "Presently Preferred".

The tests ar summarized in Table 1 below.

TABLE 1

NUTRABURGER ™ SENSORY TESTS

| PRODUCT | SIZE UNCOOKED | SIZE COOKED | AVERAGE RAW WT. | 2 PATTIES AVERAGE GRILLED WT. | AVERAGE SCORES GRILLED PATTY N/SLTD SLTD J F J F AV | AVERAGE SCORES 25 MINUTES N/SLTD SLTD J F J F AV | AVERAGE SCORES 40 MINS AFTER COOKING N/SLTD SLTD J F J F AV | AVERAGE TOTAL J F ALL |
|---|---|---|---|---|---|---|---|---|
| NUTRA/B,** 23% | 4" × 4" × 1" | 3¼" × 3¼" × 1" | 100 gms. | 86.27 gms.* | 9.0 8.7 8.3 8.8 8.7 | 8.8 9.2 8.3 8.3 8.7 | 8.2 8.2 7.7 7.7 8.0 | 8.4 8.5 8.5 |
| REG. H/B, 23% | 4" × 4" × 1" | 3" × 3" × 1" | 100 gms. | 81.37 gms. | 9.3 9.3 8.3 7.3 8.5 | 7.7 7.3 7.2 7.0 7.3 | 6.7 6.7 7.7 7.3 7.1 | 7.8 7.5 7.7 |
| LEAN H/B <9% | 4" × 4" × 1" | 3¼" × 3¼" × 1" | 100 gms. | 84.85 gms. | 5.5 5.7 3.7 4.3 4.8 | 4.2 4.0 3.8 3.5 3.5 | 3.5 2.7 3.2 3.0 3.1 | 4.0 3.9 4.0 |

PREPARED WITHOUT ADDITION OF SALT

| | GRILLED, ***PATTY NO. | | | | | | 20 MINUTES AFTER GRILLING PATTY NO. | | | | | | 40 MINUTES AFTER GRILLING PATTY NO. | | | | | |
|---|---|---|---|---|---|---|---|---|---|---|---|---|---|---|---|---|---|---|
| | 1 | | 2 | | 3 | | 1 | | 2 | | 3 | | 1 | | 2 | | 3 | |
| TESTER | J | F | J | F | J | F | J | F | J | F | J | F | J | F | J | F | J | F |
| 1 (Female) | 9 | 9 | 8 | 7 | 4 | 4 | 9 | 8 | 9 | 8 | 5 | 4 | 7 | 8 | 9 | 7 | 3 | 3 |
| 2 (Male) | 8 | 8 | 8 | 7 | 3 | 5 | 8 | 8 | 6 | 7 | 6 | 6 | 9 | 8 | 8 | 7 | 4 | 5 |
| 3 (Male) | 8 | 9 | 9 | 8 | 5 | 5 | 8 | 8 | 7 | 6 | 3 | 3 | 8 | 7 | 7 | 6 | 4 | 4 |
| 4 (Female) | 9 | 9 | 8 | 7 | 4 | 6 | 8 | 9 | 7 | 7 | 5 | 4 | 8 | 9 | 8 | 8 | 3 | 4 |
| 5 (Female) | 9 | 9 | 8 | 8 | 2 | 2 | 8 | 8 | 8 | 7 | 2 | 2 | 7 | 8 | 6 | 7 | 1 | 1 |
| 6 (Male) | 7 | 9 | 9 | 7 | 4 | 4 | 9 | 9 | 6 | 7 | 2 | 2 | 7 | 6 | 6 | 5 | 4 | 1 |
| TOTAL | 50 | 53 | 50 | 44 | 22 | 26 | 50 | 50 | 43 | 42 | 23 | 24 | 46 | 46 | 46 | 44 | 19 | 18 |

PREPARED WITH ADDITION OF SALT

| | GRILLED PATTY NO. | | | | | | 20 MINUTES AFTER GRILLING PATTY NO. | | | | | | 40 MINUTES AFTER GRILLING PATTY NO. | | | | | |
|---|---|---|---|---|---|---|---|---|---|---|---|---|---|---|---|---|---|---|
| | 1 | | 2 | | 3 | | 1 | | 2 | | 3 | | 1 | | 2 | | 3 | |
| TESTER | J | F | J | F | J | F | J | F | J | F | J | F | J | F | J | F | J | F |
| 1 (Female) | 9 | 8 | 10 | 10 | 8 | 7 | 9 | 10 | 9 | 8 | 6 | 5 | 9 | 9 | 7 | 7 | 5 | 5 |
| 2 (Male) | 9 | 9 | 9 | 9 | 7 | 7 | 9 | 10 | 8 | 8 | 6 | 5 | 9 | 9 | 8 | 7 | 5 | 4 |
| 3 (Male) | 9 | 9 | 10 | 10 | 6 | 6 | 9 | 9 | 8 | 7 | 6 | 5 | 8 | 8 | 6 | 6 | 3 | 4 |
| 4 (Female) | 8 | 8 | 9 | 9 | 4 | 5 | 9 | 9 | 8 | 7 | 3 | 4 | 8 | 9 | 7 | 8 | 3 | 4 |
| 5 (Female) | 9 | 9 | 9 | 9 | 4 | 4 | 9 | 9 | 7 | 7 | 2 | 3 | 8 | 8 | 6 | 7 | 1 | 1 |
| 6 (Male) | 10 | 9 | 9 | 9 | 4 | 5 | 8 | 8 | 6 | 7 | 2 | 2 | 7 | 6 | 6 | 6 | 4 | 2 |

TABLE 1-continued

| NUTRABURGER ™ SENSORY TESTS | | | | | | | | | | | | | | | | | | |
|---|---|---|---|---|---|---|---|---|---|---|---|---|---|---|---|---|---|---|
| TOTAL | 54 | 52 | 56 | 56 | 33 | 34 | 53 | 55 | 46 | 48 | 24 | 24 | 49 | 49 | 40 | 41 | 21 | 11 |

Sensory Rating: 1 to 10 (1-2: would not eat; 3-4: poor; 5-7: average; 7-10: good, very good, excellent
Testers: 3 males; 3 females. SLTD = Salted; N/SLTD = Not salted; J = Juiciness; F = Flavor
TESTERS' COMMENTS
NUTRABURGER ™: Very good, better flavor, higher than sample 1 or 3, maintained good juiciness; best sample; tastes juicy; better at holding juiciness; sample 1 and 2 chewed the same and were better than 3.
HAMBURGER, REG.: O.K. in juiciness and flavor, lost flavor but juiciness stayed O.K.; greasy at first; good flavor; similar at start to sample 2 but not as good at holding juiciness or flavor; excellent hot; lost flavor and juiciness quickly; appeared to be cooked less (more raw).
HAMBURGER, LEAN: Awful; dry, crumbly, greasy, low flavor; inferior; O.K. when hot, bad, touch, dry.
*5.7% OVER REGULAR HAMBURGER; 1.7% OVER LEAN HAMBURGER.
**NUTRABURGER ™: Approximately ½ the cholesterol NUTRABURGER ™ + OLESTRA ™: approximately ½ the cholesterol and less than ½ the calories.
***No. 1 = NUTRABURGER ™; No. 2 = regular hamburger; No. 3 = lean hamburger The advantages of the tested NUTRABURGER over regular and lean hamburger in terms of reduced cholesterol and calorie content and less shrinkage is obvious. Also especially significant are the testers' findings that the freshly cooked NUTRABURGER product was equal or superior to regular hamburger and far superior to lean hamburger and that, after standing for an equal length of time, the NUTRABURGER product was far superior to both regular and lean hamburger in these respects.

While the foregoing discussion has centered around the making of low cholesterol (and/or saturated fat) replacements for sausage and hamburger to the extent that it is concerned with artificial adipose, it is to be understood that this is not intended to limit the scope of the invention as defined in the appended claims and that there are many other meat products which can be similarly and advantageously replaced by combining with a low calorie meat an artificial adipose of the character disclosed herein For example, the artificial adiposes of the present invention will to some considerable extent retain their structural integrity as they are heated although they will become transparent as natural adipose does when it is heated. This is a property which can be encouraged to make an analogue of salt pork with a reduced concentration of cholesterol and/or saturated fat. Artificial adiposes as described herein can also be combined with lean pork to produce a bacon replacer which has the taste, texture, aroma, and mouth feel of conventional bacon—unlike currently available bacon replacers—but, like other of the products disclosed herein, may have a significantly reduced concentration of cholesterol and/or saturated fats The invention may be embodied in still other forms without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A meat-free gel which can be employed in the formation of artificial adiposes and in the manufacture of other products, said gel comprising:
    a cross-linkable, fibrinogen and albumin-containing protein constituent and a cross-linkable saccharide binder, said protein constituent and said binder being so cross-linked as provide matrix-forming copolymeric networks.

2. A gel as defined in claim 1 in which both said protein constituent and said saccharide binder contain cross-linked units.

3. A gel as defined in claim 1 in which there are cross-links between the saccharide binder and the protein constituent.

4. A gel as defined in claim 12 in the form of a skin or membrane.

5. A gel as defined in claim 1 in which the saccharide binder is or has the characteristics of an algin.

6. A gel as defined in claim 1 in which the saccharide binder is selected from the group consisting of algins, alginates, gellan gums, high methoxy pectins, and highly substituted carboxymethyl celluloses.

7. A gel as defined in claim 1 in which the protein constituent is selected from the group consisting of blood plasma and fresh blood.

8. A gel as defined in claim 1 which is edible.

9. A gel as defined in claim 1 in which the saccharide and the protein constituent are cross-linked with polyvalent, metal cations.

* * * * *